US012463388B2

(12) United States Patent
Qian et al.

(10) Patent No.: US 12,463,388 B2
(45) Date of Patent: Nov. 4, 2025

(54) POSITION ASSURANCE APPARATUS, CONNECTOR ASSEMBLY, BATTERY, AND POWER CONSUMPTION DEVICE

(71) Applicant: CONTEMPORARY AMPEREX TECHNOLOGY (HONG KONG) LIMITED, Hong Kong (CN)

(72) Inventors: Mu Qian, Ningde (CN); Jinmei Xu, Ningde (CN); Xiaojun Yang, Ningde (CN); Shengkai Wu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 395 days.

(21) Appl. No.: 18/061,484

(22) Filed: Dec. 5, 2022

(65) Prior Publication Data

US 2023/0123353 A1   Apr. 20, 2023

Related U.S. Application Data

(63) Continuation of application No. PCT/CN2021/111603, filed on Aug. 9, 2021.

(30) Foreign Application Priority Data

Sep. 24, 2020   (CN) ......................... 202011020089.X

(51) Int. Cl.
*H01R 13/66* (2006.01)
*B60L 50/64* (2019.01)
(Continued)

(52) U.S. Cl.
CPC .......... *H01R 13/6691* (2013.01); *B60L 50/64* (2019.02); *H01M 10/425* (2013.01);
(Continued)

(58) Field of Classification Search
CPC .............. H01R 13/6691; H01R 13/641; H01R 2201/26; H01R 13/62927; H01R 13/701;
(Continued)

(56) References Cited

U.S. PATENT DOCUMENTS 5,624,275 A    4/1997  Fukuda
6,062,899 A *  5/2000  Presley ................ H01R 13/641
                                                      439/489

(Continued)

FOREIGN PATENT DOCUMENTS

CN    101552399 A  * 10/2009 ........... H01R 13/114
CN    101821910 A    9/2010
(Continued)

OTHER PUBLICATIONS

The extended European search report received in the corresponding European Application 21871115.8, mailed Aug. 23, 2023.
(Continued)

*Primary Examiner* — Travis S Chambers
(74) *Attorney, Agent, or Firm* — K&L Gates LLP

(57) ABSTRACT

A position assurance apparatus, which is used for a connector assembly connected to a signal circuit are provided. The connector assembly comprises a first connector and a second connector, which are connected in pairs, wherein the first connector is connected to the signal circuit, and the second connector is inserted in the first connector. The position assurance apparatus comprises a first connecting portion and a second connecting portion, which are electrically connected to each other. The first connecting portion and the second connecting portion are configured to be electrically connected to the signal circuit by means of the first connector, so as to turn on the signal circuit when the first connector and the second connector are inserted in place.

12 Claims, 16 Drawing Sheets

(51) Int. Cl.
*H01M 10/42* (2006.01)
*H01M 50/545* (2021.01)
*H01R 13/641* (2006.01)

(52) U.S. Cl.
CPC ........ *H01M 50/545* (2021.01); *H01R 13/641* (2013.01); *H01R 2201/26* (2013.01)

(58) Field of Classification Search
CPC .. H01R 13/62955; H01R 31/08; H01R 31/06; B60L 50/64; B60L 2270/145; H01M 10/425; H01M 50/545; H01M 2220/20; H01M 50/209; H01M 50/249; H01M 50/271; H01M 50/287; H01M 50/296; H01M 10/4285; Y20E 60/10
See application file for complete search history.

(56) References Cited

U.S. PATENT DOCUMENTS

| | | | |
|---|---|---|---|
| 10,038,278 | B2 | 7/2018 | Lane et al. |
| 2015/0171551 | A1 | 6/2015 | Iwatani |
| 2020/0028307 | A1 | 1/2020 | Demaratos |
| 2020/0153159 | A1 | 5/2020 | Gartenmaier |

FOREIGN PATENT DOCUMENTS

| | | | |
|---|---|---|---|
| CN | 202205925 | U | 4/2012 |
| CN | 102460851 | A | 5/2012 |
| CN | 105531886 | A | 4/2016 |
| CN | 105789997 | A | 7/2016 |
| CN | 106340771 | A | 1/2017 |
| CN | 106654765 | A | 5/2017 |
| CN | 107026343 | A | 8/2017 |
| CN | 208336617 | U | 1/2019 |
| CN | 209298422 | U | 8/2019 |
| CN | 209298423 | U | 8/2019 |
| CN | 110612643 | A | 12/2019 |
| CN | 111095599 | A | 5/2020 |
| CN | 111180952 | A | 5/2020 |
| CN | 111585103 | A | 8/2020 |
| CN | 112310691 | A | 2/2021 |
| DE | 102016209472 | A1 | 11/2017 |
| EP | 2811586 | A1 | 12/2014 |
| EP | 3591769 | A1 | 1/2020 |
| JP | H0545935 | U * | 6/1993 |
| JP | 2006351415 | A | 12/2006 |
| JP | 2009206095 | A | 9/2009 |
| WO | 2011124563 | A1 | 10/2011 |
| WO | 2016082326 | A1 | 6/2016 |
| WO | 2017207453 | A1 | 12/2017 |
| WO | 2018220180 | A1 | 12/2018 |

OTHER PUBLICATIONS

The partial supplementary European search report received in the corresponding European Application 21871615.7, mailed Sep. 1, 2023.

International Search Report received in the corresponding International Application PCT/CN2021/111603, mailed Oct. 25, 2021.

International Search Report received in the corresponding International Application PCT/CN2021/120432, mailed Dec. 30, 2021.

The first Office Action received in the corresponding Chinese Application 202011020089.X, mailed Aug. 3, 2020.

The First Office Action received in the counterpart CN application 202180049001.3, mailed on Apr. 22, 2025, 21 pages with English translation.

Non-Final Office Action, mailed Aug. 21, 2025, for counterpart U.S. Appl. No. 18/166,919.

\* cited by examiner

POSITION ASSURANCE APPARATUS, CONNECTOR ASSEMBLY, BATTERY, AND POWER CONSUMPTION DEVICE

CROSS REFERENCE

The present disclosure is a continuation of International Application PCT/CN2021/111603, filed Aug. 9, 2021, which claims the priority to the Chinese patent application 202011020089.X filed on Sep. 24, 2020, titled "Position Assurance Apparatus, Connector Assembly, Battery and Power Consumption Device", the entire content of which is incorporated herein by reference

TECHNICAL FIELD

The present disclosure relates to a position assurance apparatus (CPA), a connector assembly including the position assurance apparatus, a battery including the connector assembly, a power consumption device equipped with the battery and a connector assembly system.

In another aspect, the present disclosure also relates to a method for assembling a connector assembly.

BACKGROUND

When an electrical signal and/or data signal and/or radio frequency signal is transmitted, it is known to use a first connector and a second connector that are inserted into each other. To ensure signal transmission, it is required that the first connector and the second connector are inserted in place during application, and the effectiveness of the insertion cannot be inadvertently destroyed during use, thereby ensuring a power, optical or data connection. However, in actual use, the first connector and the second connector often appear to be inserted in place when viewed from the outside, but they are not actually inserted in place. In order to prevent such risk, there is an urgent need for a device that can reflect in a reliable manner whether the connectors in pairs are inserted in place.

SUMMARY

An object of the present disclosure is to provide a position assurance apparatus, a connector assembly, a battery, a power consumption device and a connector assembly system, aiming to reflect in a reliable manner whether the connectors in pairs are inserted in place, so as to avoid a security risk caused by improper insertion connectors.

A first aspect of the present disclosure relates to a position assurance apparatus for a connector assembly connected with a signal circuit, wherein the connector assembly comprises a first connector and a second connector connected in pairs, the first connector is connected with the signal circuit, and the second connector is inserted in the first connector, the position assurance apparatus comprising:
 a first connecting portion;
 a second connecting portion electrically connected with the first connecting portion,
 wherein the first connecting portion and the second connecting portion are configured to be electrically connected with the signal circuit via the first connector, so as to turn on the signal circuit when the second connector is inserted in the first connector in place.

In some embodiments of the present disclosure, the first connecting portion comprises two elastic tabs disposed oppositely to each other, and each of the elastic tabs comprises an elastic contacting portion configured to be electrically connected with the first connector.

In some embodiments of the present disclosure, each of the two elastic tabs comprises an indentation, and the indentation is used for reducing a distance between the elastic contacting portions of the two elastic tabs, to ensure that at least a part of the first connector inserted between the elastic contacting portions of the two elastic tabs is in close contact with the elastic contacting portion.

In some embodiments of the present disclosure, the position assurance apparatus comprises a conductive base in a shape of a hollow sleeve, wherein the conductive base comprises a first end and a second end disposed opposite to each other, and the first connecting portion and the second connecting portion are configured to be connected with the first end.

In some embodiments of the present disclosure, the position assurance apparatus comprises a body portion provided with a slot, wherein the second end of the conductive base is configured to be matched with the slot so that the conductive base is mounted on the body portion.

A second aspect of the present disclosure relates to a connector assembly comprising: a first connector to be connected with a signal circuit; a second connector comprising an opening and configured to be inserted in the first connector; and the position assurance apparatus according in the first aspect of the present disclosure to be pressed into the opening and turn on the signal circuit when the second connector is inserted in the first connector in place.

In some embodiments of the present disclosure, the connector assembly comprises a limiting member for preventing the position assurance apparatus from being pressed into the opening and turning on the signal circuit via the first connector when the second connector is not inserted in the first connector in place.

In some embodiments of the present disclosure, the limiting member comprises: a first limiting element disposed on the second connector; a second limiting element disposed on the position assurance apparatus, wherein the first limiting element is configured to be engaged with the second limiting element to prevent the position assurance apparatus from being pressed into the opening to turn on the signal circuit when it is in the first position, and allow the position assurance apparatus to be pressed into the opening and turn on the signal circuit when it is in the second position.

In some embodiments of the present disclosure, the second limiting element comprises elastic pieces disposed on both sides of the position assurance apparatus, and the elastic pieces are configured to protrude from the opening when the first limiting member rotates to the first position to prevent the position assurance apparatus from being pressed into the opening.

In some embodiments of the present disclosure, the first limiting element is configured as a rotating member comprising a protrusion, and the protrusion is configured to press the elastic pieces into the opening when the first limiting element rotates to the second position, thereby pressing the position assurance apparatus into the opening.

In some embodiments of the present disclosure, the first limiting element is configured as a sliding member comprising a stepped portion, and the stepped portion is configured to allow the position assurance apparatus to be pressed into the opening and turn on the signal circuit when the first limiting element moves to the second position.

In some embodiments of the present disclosure, the second limiting element comprises an abutting portion, and the abutting portion is configured to abut against the stepped portion when the first limiting element moves to the first position, to prevent the position assurance apparatus from being pressed into the opening.

A third aspect of the present disclosure relates to a battery comprising: a battery cell; the connector assembly in the second aspect of the present disclosure; a circuit board comprising a signal circuit, wherein the signal circuit is configured to be turned on via the position assurance apparatus when the second connector is inserted in the first connector in place; a battery management system used to detect a voltage of the signal circuit and issue an alarm signal when the voltage is zero to prompt that the connector assembly is not inserted in place.

A fourth aspect of the present disclosure relates to a power consumption device comprising the battery in the third aspect of the present disclosure.

A fifth aspect of the present disclosure relates to a connector assembly system comprising: a first assembly device configured to insert a second connector in a first connector of a connector assembly in place; a second assembly device configured to press the position assurance apparatus into the opening of the second connector and turn on a signal circuit via the first connector.

A sixth aspect of the present disclosure relates to a method for assembling a connector assembly comprising steps of: inserting a second connector in a first connector of the connector assembly in place; pressing the position assurance apparatus in the first aspect of the present disclosure into an opening of the second connector and turning on a signal circuit via the first connector.

In some embodiments of the present disclosure, the method for assembling a connector assembly further comprises steps of: operating the limiting member when the second connector is not inserted in the first connector in place, to prevent the position assurance apparatus from being pressed into the opening and turning on the signal circuit via the first connector.

The connector assembly with the position assurance apparatus according to the present disclosure has following advantages.

(i) The signal circuit from the circuit board is used to determine whether the connectors in pairs are inserted in place, and compared with a traditional manual marking method, the detection method is simple and effective.

(ii) During the use of the vehicle, it is possible to directly detect whether the connector assembly fails, thereby improving the safety of the connector assembly in use.

(iii) Compared with a high voltage interlock connector or a micro switch as a position assurance apparatus conventionally used, the detection cost is reduced.

BRIEF DESCRIPTION OF THE DRAWINGS

In order to further illustrate the position assurance apparatus, connector assembly, battery, power consumption device, connector assembly system and the method for assembling a connector assembly of the present disclosure, the present disclosure will be described in detail below in conjunction with accompanying drawings and specific embodiments.

FIGS. 14A-14C show an connector assembly before the position assurance apparatus of the present disclosure is assembled in place, wherein FIG. 14A is a top plan view of the connector assembly, and FIG. 14B is sectional view of the connector assembly taken along line II-II in FIG. 14B, and FIG. 14C is a sectional view of the connector assembly taken along line III-III in FIG. 14A; and FIGS. 14D-14F show an connector assembly after the position assurance apparatus of the present disclosure is assembled in place, wherein FIG. 14D is a top plan view of the connector assembly, FIG. 14E is a sectional view of the connector assembly taken along line IV-IV in FIG. 14D, and FIG. 14F is a sectional view of the connector assembly taken along line V-V in FIG. 14D.

DETAILED DESCRIPTION

Figure 1:
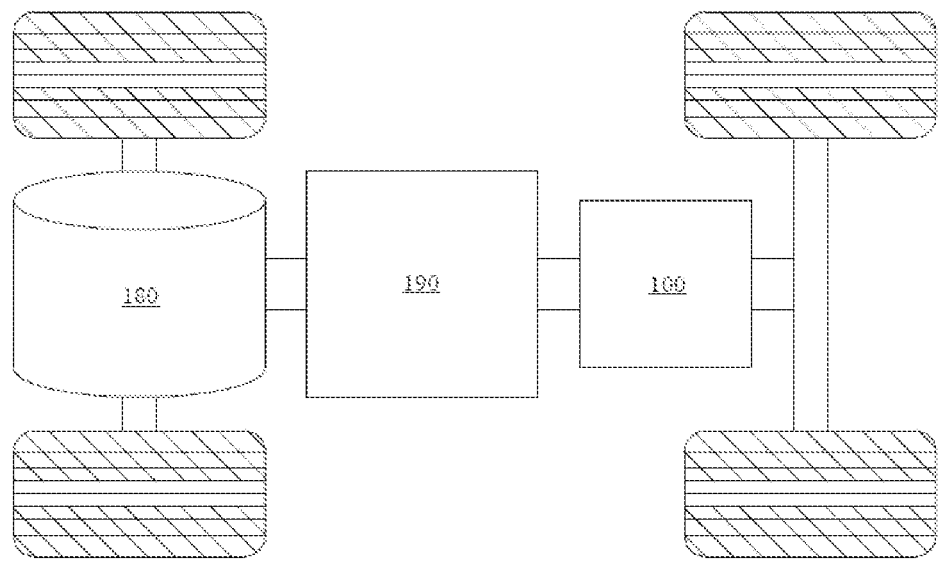
FIG. 1 is a structural view of a vehicle according to an embodiment of the present disclosure.

A position assurance apparatus 150, a connector assembly 120, a battery 100, a power consumption device, a connector assembly system, and a method for assembling the connector assembly 120 of the present disclosure will be described in conjunction with accompanying drawings below. The same part are designated with the same reference numeral.

It should be clear that embodiments described in this specification only cover a part of the embodiments of the present disclosure, but not all of the embodiments. Based on the embodiments described in the specification, all other embodiments obtained by those of ordinary skill in the art without creative work fall within the protection scope of the present disclosure.

Unless otherwise defined, all technical and scientific terms used in the present disclosure have the same meaning as commonly understood by those skilled in the technical field of the present disclosure. The terms used in the specification of the present disclosure in the present disclosure are only for the purpose of describing specific examples, and are not intended to limit the present disclosure. The terms "comprising" and "having" in the description and claims of the present disclosure and the brief description of the drawings, as well as any variations thereof, are intended to cover non-exclusive inclusions. The terms "first", "second" and the like in the description and claims of the present disclosure or the above drawings are used to distinguish different objects, rather than to describe a specific order or primary and secondary relationship.

The terms used in the embodiments of the present disclosure are only for the purpose of describing specific embodiments, and are not intended to limit the present disclosure. As used in the embodiments of the present disclosure and the appended claims, the singular forms "a," "the," and "the" are intended to include the plural forms as well, unless otherwise indicated.

In the description of the present disclosure, it should be noted that, unless otherwise expressly specified and limited, the terms "installed", "connected to", "connected with" "attached" and the like should be understood in a broad sense, for example, it may be a fixed connection, a detachable connection, or an integral connection; it can be a direct connection, an indirect connection through an intermediate medium, or an internal communication between two components. For those of ordinary skill in the art, the specific meanings of the above terms in the present disclosure can be understood according to specific situations.

In the description of the present disclosure, the term "inserted in place" means that when the second connector of the connectors in pairs is inserted in the corresponding first connector, the second connector is securely inserted in the first connector by a mechanical structure. This meaning is easily understood and defined by those of ordinary skill in the art.

In the present disclosure, a battery cell can include lithium ion secondary battery, lithium ion primary battery, lithium sulfur battery, sodium lithium ion battery, sodium ion battery or magnesium ion battery, etc., which is not limited in the embodiment of the present disclosure. The battery cell may be in the form of a cylinder, a flat body, a rectangular parallelepiped, or other shapes, which are not limited in an embodiment of the present disclosure. The battery cell is generally divided into three types according to a packaging method: a cylindrical battery cell, a square-shaped battery cell, and a soft-pack battery cell, which are not limited in an embodiment of the present disclosure.

The battery mentioned in the embodiments of the present disclosure refers to a single physical module including one or more battery cells to provide higher voltage and capacity. For example, the battery mentioned in the present disclosure may include a battery module or a battery pack, and the like. The battery typically includes a case for enclosing one or more battery cells. The case can prevent liquids or other foreign objects from affecting charging or discharging of the battery cell.

The battery cell includes an electrode assembly and an electrolyte, and the electrode assembly is made up of a positive electrode sheet, a negative electrode sheet and a separating film. The battery cell works mainly by metal ions moving between the positive sheet and negative sheet. The positive sheet includes a positive current collector and a positive active material layer coated on a surface of the positive current collector. The current collector without the positive active material layer protrudes from the current collector coated with the positive active material layer, and the current collector not coated with the positive active material layer serves as the positive tab. Taking the lithium-ion battery as an example, the material of the positive current collector can be aluminum, and the positive active material can be lithium cobalt oxide, lithium iron phosphate, ternary lithium, or lithium manganate. The negative sheet comprises a negative current collector and a negative active material layer. The negative active material layer is coated on a surface of the negative current collector. The current collector without the negative electrode active material layer protrudes from the current collector coated with the negative electrode active material layer. The current collector not coated with the negative active material layer serves as the negative tab. The material of the negative current collector can be copper, and the negative active material can be carbon or silicon. In order to ensure that a large current is passed without fusing, multiple positive tabs are provided and stacked together, and multiple negative tabs are provided and stacked together. The material of the separating film can be PP or PE, etc. In addition, the electrode assembly may be in a wound structure or a laminated structure, and the embodiment of the present disclosure is not limited thereto.

The applicant found that although the conventional position assurance apparatus utilizes a mechanical structure to ensure that the connector assembly with two connectors fully inserted with each other, it cannot directly detect whether the connector assembly has been fully inserted. A current common practice is to use manual marking to confirm that the connector is inserted in place, and its work accuracy and efficiency need to be improved. In addition, the conventional connector position assurance apparatus is at risk of vibration failure or detachment when the inserted connector assembly is subjected to shock and/or vibration, but users cannot directly detect whether the position assurance apparatus at the connector has vibration failure or detachment.

In view of this, the present disclosure solves the above-mentioned technical problem by providing a position assurance apparatus. The present disclosure is different from the prior art in the technical concept of confirming that the connector assembly is inserted in place by using a mechanical structure, and innovatively introduces a circuit into the connector assembly and judges whether the connector assembly is inserted in place by detecting whether the circuit is connected or not, obtaining an unexpected technical effect.

The technical solutions described in the embodiments of the present disclosure are all applicable to various devices using the battery, such as a mobile phone, a portable device, a notebook computer, a battery car, an electric toy, an electric tool, an electric vehicle, a ship, a spacecraft, etc. For example, the spacecraft includes an airplane, a rocket, a space shuttle, and a spaceship.

It should be understood that the technical solution described in the embodiment of the present disclosure is not only limited to the equipment described above, but also applicable to all equipment using batteries, but for the sake of brevity, the following embodiments all take electric vehicles as an example Be explained.

As shown in FIG. 1, a structural view of a vehicle 1 of an embodiment of the present application is shown. The vehicle 1 can be a fuel vehicle, a gas vehicle or a new energy vehicle, and the new energy vehicle can be a pure electric vehicle, a hybrid vehicle or extended-range cars, etc. A drive motor 180 is attached to front axles of the two front wheels of the vehicle. In addition, the vehicle is also equipped with a controller 190 and a battery 100. As is well known to those of ordinary skill in the art, the controller 190 and battery 100 are typically disposed at appropriate locations on a main shaft of the vehicle in order to control the operation of various components of the vehicle and to provide driving power for the vehicle.

In order to meet different power usage requirements, the battery 100 may include a plurality of battery cells 100a. The plurality of battery cells 100a may be connected in series or in parallel or in a mixed connection, and the mixed connection refers to a mixture of the series connection and the parallel connection. The battery 100 may also be referred to as a battery pack. Optionally, the plurality of battery cells 100a may be connected in series or in parallel or in the mixed connection to form a battery module, and then a plurality of battery modules may be connected in series or in parallel or in the mixed connection to form the battery 100. That is to say, the plurality of battery cells 100a can directly form the battery 100, or the battery module can be formed at first, and then the battery module form the battery 100.

Figure 2:
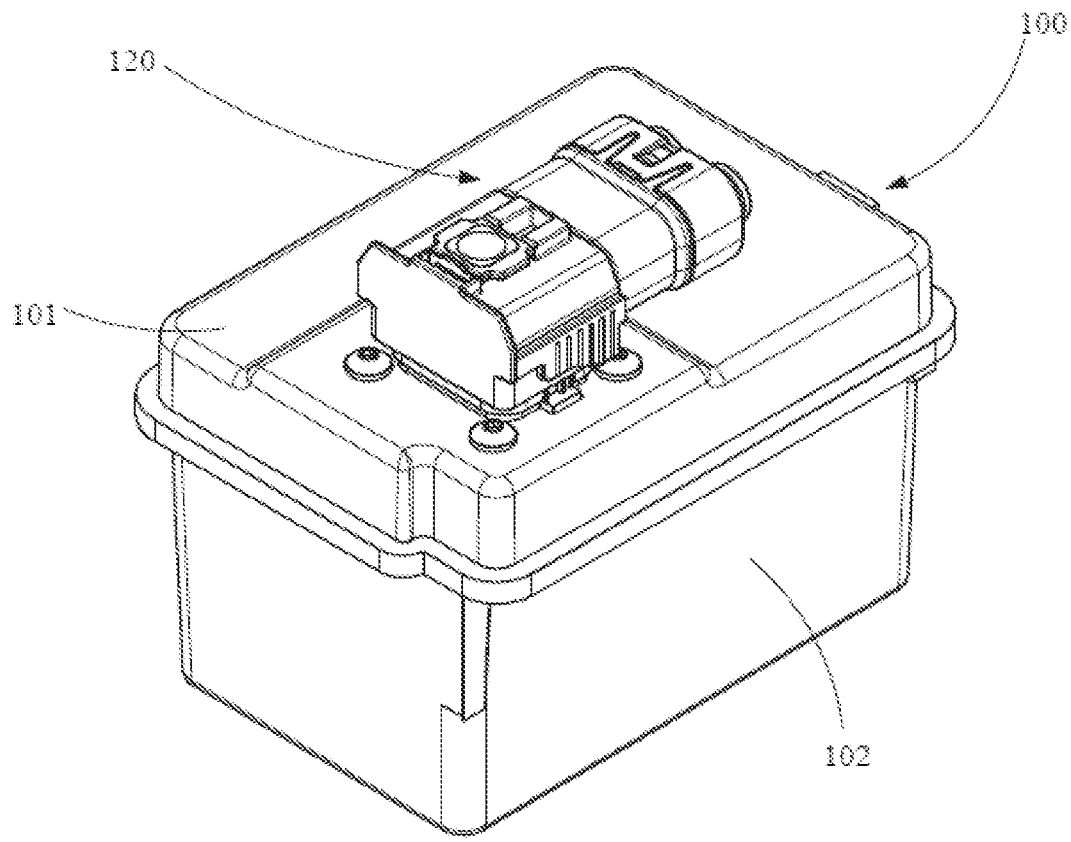
FIG. 2 shows a battery equipped with a connector assembly of the present disclosure.
Figure 3:
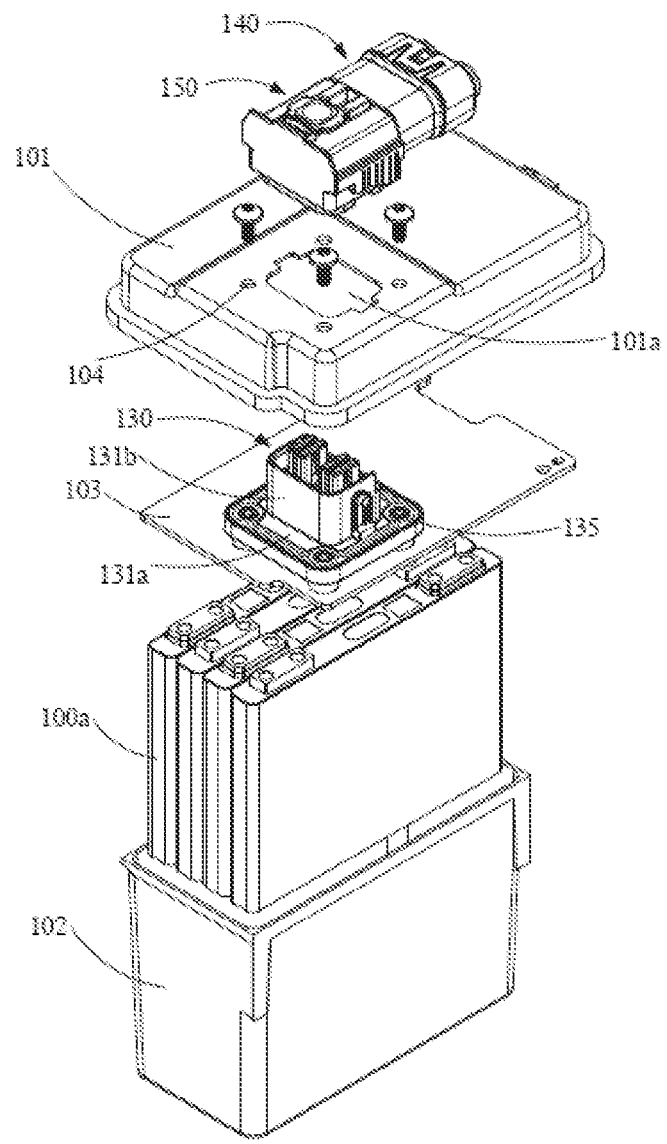
FIG. 3 is an exploded view of the battery shown in FIG. 2.

As shown in FIGS. 2 and 3, a schematic structural view and an exploded view of the battery 100 according to an embodiment of the present disclosure are respectively shown, the battery 100 may include the plurality of battery cells 100a. The battery 100 may further include a case. The case has a hollow structure, and the plurality of battery cells 100a are accommodated in the case. As shown in FIG. 3, the case may include two parts which are referred to here as a housing 102 and a cover 101 respectively, and the cover 101 covers the housing 102. The shapes of the housing 102 and the cover 101 may be determined according to the shape of the plurality of battery cells 100a which have been combined, and each of the housing 102 and the cover 101 may have one opening. For example, each of the housing 102 and the cover 101 may be a hollow cuboid with only one surface being configured as an open surface, the opening of the housing 102 and the opening of the cover 101 are arranged opposite to each other, and the cover 101 covers the housing 102 to form the casing having a closed chamber. The plurality of battery cells 100a are connected in parallel or in series or in the mixed connection with each other and then placed in the casing formed by the cover 101 and the housing 102 covered by the cover.

A circuit board 103 together with the battery cells 100a are placed in the housing 102. A first connector 130 is mounted on the circuit board 103. A second connector 140 is inserted in the first connector 130 to constitute the connector assembly 120 with two connectors in pairs. The first connector 130 includes a base portion 131a and a protruding portion 131b extending from the base portion 131a toward the cover 101 and beyond the cover 101. The cover 101 is provided with an avoidance hole 101a through, the protruding portion 131b of the first connector 130 protrudes from the cover 101 via the avoidance hole and is inserted in the second connector 140 located outside the cover 101. The base portion 131a of the first connector 130 is provided with at least one (four in this embodiment) fastening holes 135, and the same number of screw holes 104 are correspondingly provided around the avoidance hole 101a of the cover 101. The base portion 131a of the first connector 130 is fixed to the cover 101 with fasteners (e.g., screws, bolts, etc.).

Via the above arrangement, the base portion 131a of the first connector 130, the circuit board 103 and the battery cell 100a are sealed in the housing 102. The protruding portion 131b of the first connector 130 is configured to pass through the avoidance hole 101a and inserted in the second connector 140 outside the cover 101 to constitute the connector assembly 120 with two connectors in pairs.

The circuit board 103 is also provided with a signal circuit. The signal circuit is configured to be turned on through the position assurance apparatus 150 when the second connector 140 is inserted in the first connector 130 in place. The specific structure of the position assurance apparatus 150 will be described in detail below.

Figure 4:
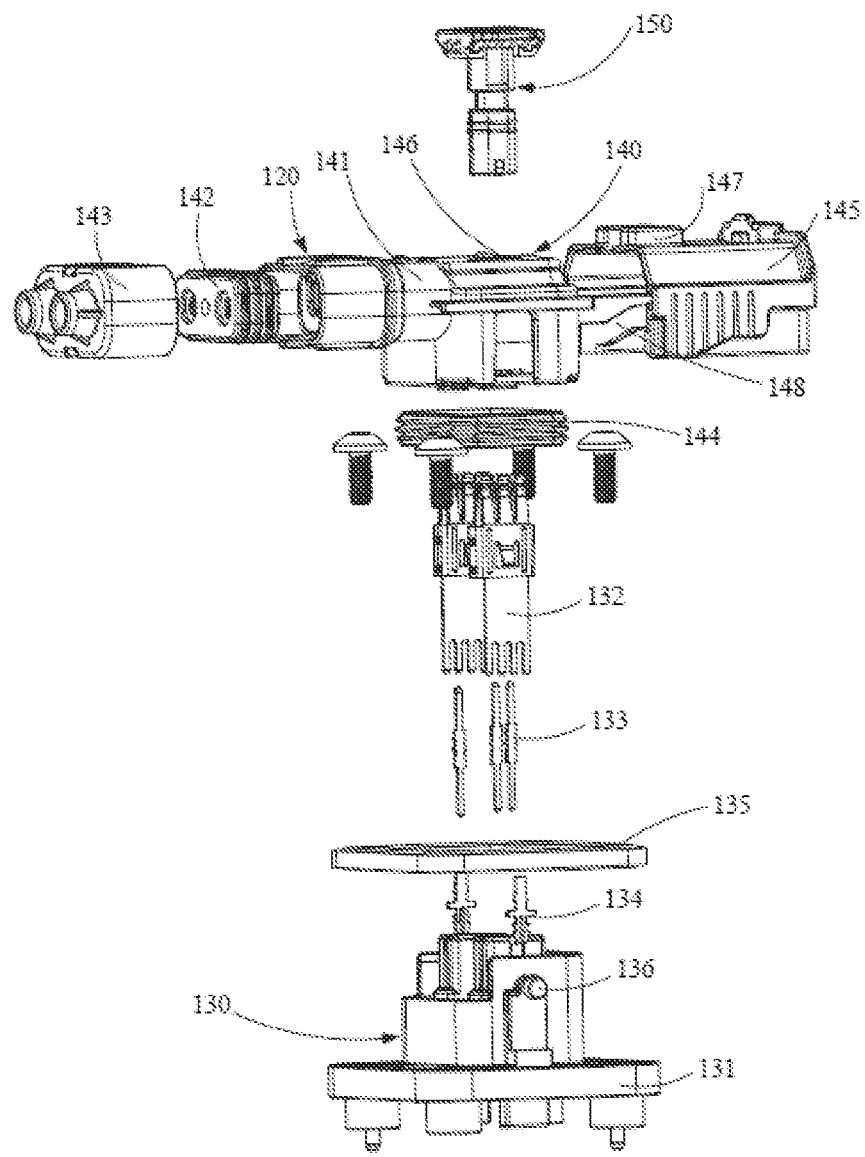
FIG. 4 is an exploded schematic view of a connector assembly of an embodiment of the present disclosure.
Figure 5:
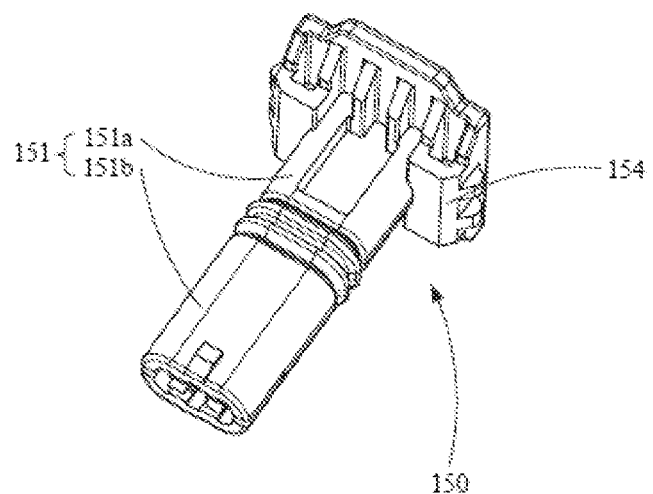
FIG. 5 is a perspective view of a position assurance apparatus in an embodiment used in a connector assembly.

The battery 100 further includes a battery management system (not shown in the figure), which can detect the voltage of the signal circuit and issue an alarm signal when the voltage is zero to prompt that the connector assembly 120 is not properly inserted. Of course, those skilled in the art can easily understand that means, such as voice control and lighting, can also be used to prompt that the connector assembly 120 is not properly inserted, and these means should be regarded as equivalent embodiments of the present disclosure. As shown in FIG. 4, it is an exploded schematic view of the connector assembly 120 according to an embodiment of the present disclosure. The connector assembly 120 includes the first connector 130 to be connected with the signal circuit of the circuit board 103 (not shown in FIG. 4), the second connector 140 having an opening 146, and the position assurance apparatus 150. The second connector 140 is configured to be inserted in the first connector 130, and the position assurance apparatus 150 is configured to be pressed into the opening 146 to turn on the signal circuit when the second connector 140 is inserted in the first connector 130 in place.

The first connector 130 is provided with metal power terminals 132, LIN wire solder pins 133, and signal wire pins 134. One or more of the metal power terminals 132, LIN wire solder pins 133 and signal wire pins 134 are directly soldered to the circuit board 103 using means, such as wave soldering. The first connector 130 is integrally sealed via a socket sealing ring. The second connector 140 includes a plug body 141 provided with an opening 146, a wire cover 143 sealed to a first end of the plug body 141 with a wire sealing ring 142, and a sliding cover 145a provided at a second end of the plug body 141 and slides back and forth on the plug body 141. The second connector 140 is integrally sealed via a plug seal 144. Except for the plug body 141 provided with the opening 146 and the sliding cover 145, the above-mentioned other components are well known to those skilled in the art, and thus further description of these components is omitted.

FIG. 5, FIG. 6, FIG. 7 and FIG. 8 are a perspective view, an exploded view, a side view and a sectional view of the position assurance apparatus 150 according to an embodiment of the present disclosure, respectively. Referring to FIGS. 5, 6, 7 and 8, the position assurance apparatus 150 includes a body portion 151, a sealing ring 152 and a conductive sheet 153. The body portion 151 is formed by injection molding, and a ring groove for accommodating the sealing ring 152 is provided in the middle portion of the body portion 151. The ring groove divides the body portion 151 into two portions, i.e., an upper body portion 151a and a lower body portion 151b. At least a part of the upper body portion 151a, usually both sides of the top of the upper body portion 151a, are formed with abutting portions 154, and a side of each abutting portion 154 facing the sealing ring 152 is flat.

Continue to refer to FIGS. 5, 6, 7 and 8. The lower body portion 151b is in the shape of a hollow sleeve. An engaging portion 156 that is engaged with the conductive sheet 153 is formed in the hollow sleeve of the lower body portion 151b. In this embodiment, the engaging portion 156 is a protrusion protruding from the inner surface of the hollow sleeve, but those skilled in the art can also use other forms of elements to engage the conductive sheet 153. After the conductive sheet 153 is engaged with the engaging portion 156 of the lower body portion 151b, the conductive sheet 153 is almost invisible when viewed from the outside of the position assurance apparatus 150.

Figure 6:
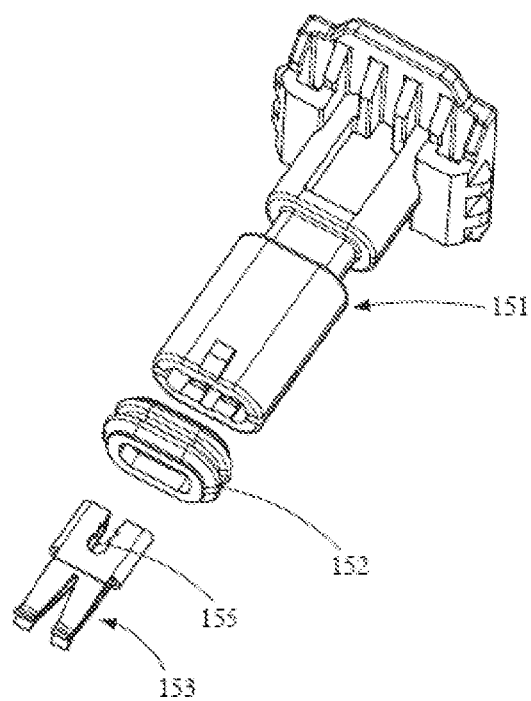
FIG. 6 is an exploded view of the position assurance apparatus shown in FIG. 5.

Refer to FIGS. 2 and 6. The conductive sheet 153 includes a first connecting portion 153a and a second connecting portion 153b electrically connected to the first connecting portion 153a. The first connecting portion 153a and the second connecting portion 153b are configured to be electrically connected with the signal circuit via the first connector 130 (not shown in the figure), to turn on the signal circuit when the second connector 140 is inserted in the first connector 130 in place.

Figure 6A:
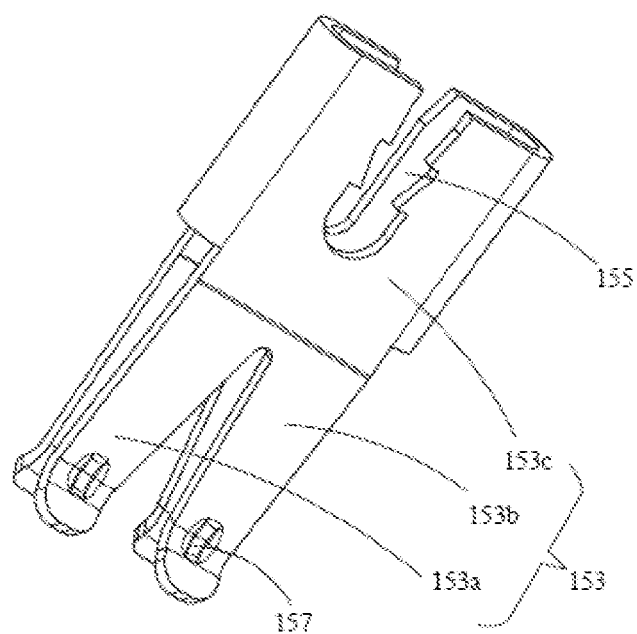
FIG. 6A is an enlarged schematic view of a conductive sheet in another embodiment of the position assurance apparatus in FIG. 6.
Figure 7:
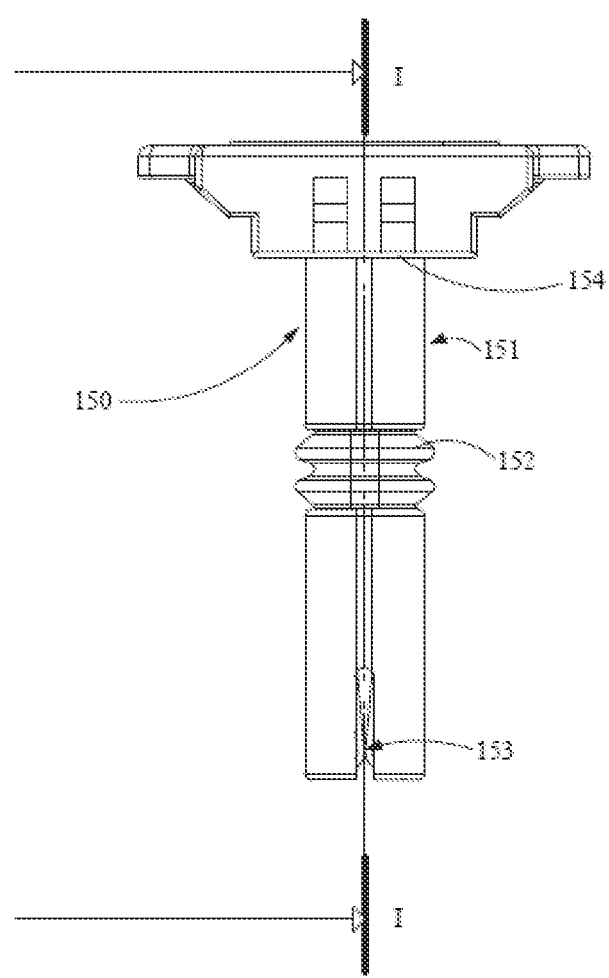
FIG. 7 is a side view of the position assurance apparatus shown in FIG. 5.
Figure 8:
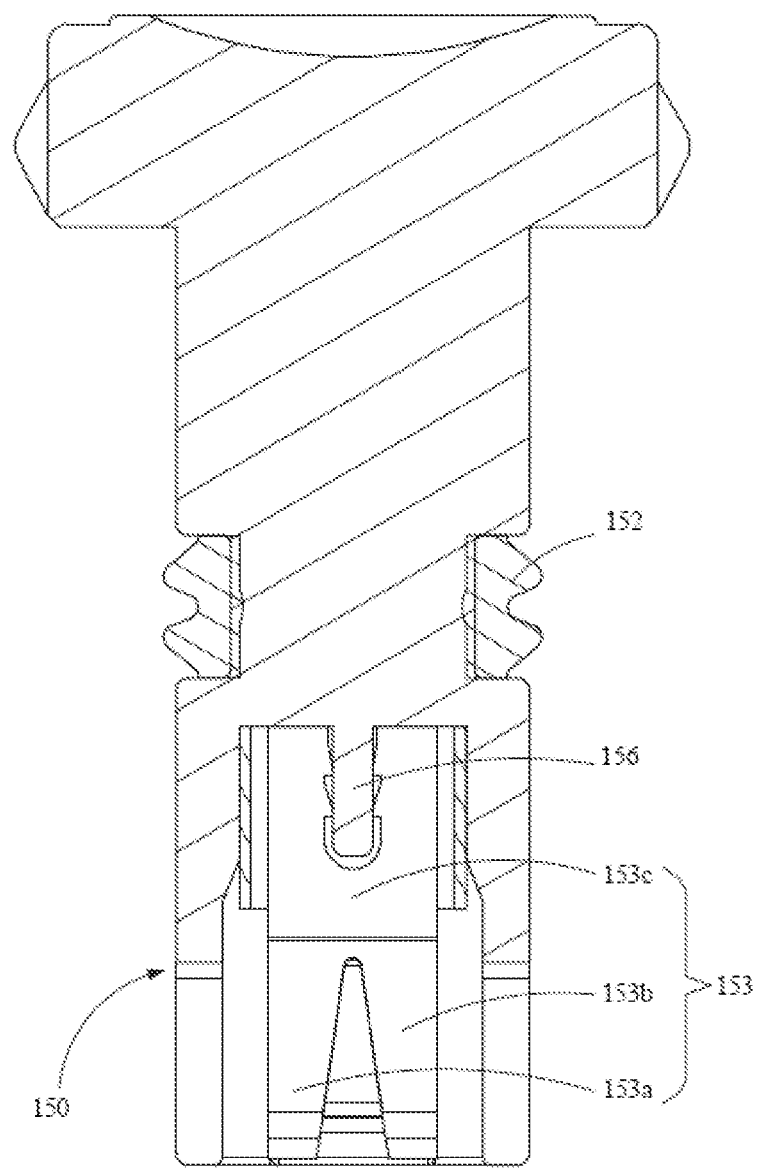
FIG. 8 is a sectional view of the position assurance apparatus taken along line I-I in FIG. 7.

FIG. 6A is an enlarged view of the conductive sheet 153 of another embodiment as shown in FIG. 6. This figure clearly shows the configuration of the conductive sheet 153 that is engaged inside the lower body portion 151b. Referring to FIG. 6A, it can be seen that the conductive sheet 153 includes at least a first connecting portion 153a and a second connecting portion 153b that are bifurcated in a "V" shape. Both the first connecting portion 153a and the second connecting portion 153b are conductive and made of such as metal. The first connecting portion 153a and the second connecting portion 153b are configured to be electrically connected to each other. The first connecting portion 153a and the second connecting portion 153b are also electrically connected to the signal circuit from the circuit board 103 through two of the three LIN wire solder pins 133 of the first connector 130 to turn on the signal circuit when the second connector 140 is inserted in the first connector 130 in place.

In some embodiments, the first connecting portion 153a includes two elastic tabs oppositely arranged, each elastic tab includes an elastic contacting portion configured to be electrically connected to the first connector 130.

As shown in FIG. 6A, the first connecting portion 153a is composed of a pair of elastic tabs arranged opposite to each other, and each of the elastic tabs is an elongated metal tab with elasticity. Ends of the pair of elastic tabs approach each other and are bent to form the elastic contacting portion. A gap allowing the LIN wire solder pin 133 of the first connector 130 to be inserted therein is formed between the elastic contacting portions of the two elastic tabs. When the LIN wire solder pin 133 is inserted in the gap formed by the elastic contacting portions of the two elastic tabs, the LIN wire solder pin 133 and the first connecting portion 153a are electrically connected to each other. The elastic tab also includes an indentation 157, the indentation is used for reducing the distance between the elastic contacting portions of the two elastic tabs to ensure that the elastic contacting portions of the two elastic tabs can be in close contact with conductors such as the LIN wire solder pins 133. It can be understood that the second connecting portion 153b may have the same structure as the first connecting portion 153a, so the position assurance apparatus 150 is connected to a signal line. Optionally, the conductive sheet 153 further includes a conductive base 153c. The conductive base 153c is in the shape of a hollow sleeve, and includes a first end and a second end disposed opposite to each other. The first connecting portion 153a and the second connecting portion 153b are connected to the first end of the conductive base 153c. Optionally, the second end of the conductive base 153c forms an engaging notch 155, and the shape of the engaging notch 155 is substantially the same as that of the engaging portion 156 of the lower body portion 151b. In this way, the engaging notch 155 and the engaging portion 156 can cooperate to fix the conductive sheet 153 in the body portion 151 of the position assurance apparatus 150. Optionally, a notched shape of the engaging notch 155 is serrated, to increase a frictional force when the engaging notch 155 is engaged with the engaging portion 156. In order to prevent the position assurance apparatus 150 from being pressed into the opening 146 and turning on the signal circuit via the first connector 130 when the second connector 140 is not inserted in the first connector 130 in place, the connector assembly 120 is further provided with a limiting member.

In some embodiments, the limiting member may be individually provided on the position assurance apparatus 150, the first connector 130 or the second connector 140. No matter where it is provided, it only needs to be able to prevent the position assurance apparatus 150 from being pressed into the opening 146 of the second connector 140 when the second connector 140 is not inserted in the first connector 130 in place. For example, the limiting member may be a latch provided individually on the position assurance device 150. When the connector assembly 120 is not inserted in place, the latch can abut the second connector 140 to prevent the position assurance apparatus 150 from being pressed into the opening 146. When the connector assembly 120 is inserted in place, the latch can be removed, thereby allowing the position assurance apparatus 150 to be pressed into the opening 146.

In some embodiments, the limiting member comprises: a first limiting element arranged on the second connector; and a second limiting element arranged on the position assurance apparatus. The first limiting element is configured to cooperate with the second limiting element to prevent the position assurance apparatus from being pressed into the opening to turn on the signal circuit when it is at a first position, and allows the position assurance apparatus to be pressed into the opening and turn on the signal circuit when it is at a second position. Specifically, the limiting member is composed of at least two parts, namely: the first limiting element located in the second connector 140 and the second limiting element located in the position assurance apparatus 150. The first limiting element is configured to cooperate with the second limiting element to prevent the position assurance apparatus 150 from being pressed into the opening 146 to turn on the signal circuit at the first position, and allows the position assurance apparatus 150 to be pressed into the opening 146 and turn on the signal circuit.

As shown in FIG. 4, the first limiting element is a sliding member with a stepped portion 147, that is, a sliding cover 145. The second limiting element is configured as an abutting portion 154 on the position assurance apparatus 150. The stepped portion 147 is formed on the top of the sliding cover 145 and protrudes from the top of the sliding cover 145. An inner wall of the sliding cover 145 is provided with a sliding groove 148 or a similar structure for the sliding cover 145 to slide on the second connector 140. When the sliding cover 145 and the stepped portion 147 thereon slide to the first position on the second connector 140, the abutting portion 154 provided on the top of the body portion 151 of the position assurance apparatus 150 will abut against the stepped portion 147 on the top of the sliding cover 145, to prevent the position assurance apparatus 150 from being pressed into the opening 146. When the sliding cover 145 and the stepped portion 147 thereon slide to the second position on the second connector 140, the second connector 140 is inserted in the first connector 130 in place, the abutting portion 154 will no longer contact the stepped portion 147, thus allowing the position assurance apparatus 150 to be pressed into the opening 146 and turn on the signal circuit of the circuit board 103.

Four operational steps of assembling the connector assembly 120 will be briefly described below in conjunction with FIGS. 9A-9D. FIGS. 9A-9D respectively show the connector assembly 120 in four states of un-assembly, pre-assembly, insertion in place and assembly in place. When the connector assembly 120 is in the states of un-assembly and pre-assembly, the sliding cover 145 is configured in the first position, that is, the stepped portion 147 abuts against the abutting portion 154 to prevent the position assurance apparatus 150 to be pressed into the opening 146 to turn on the signal circuit. When the connector assembly 120 is in the states of insertion in place and assembly in place, the sliding cover 145 is configured in the second position, that is, the stepped portion 147 no longer abuts against the abutting portion 154 to allow the position assurance apparatus 150 to be pressed into the opening 146 to turn on the signal circuit.

Figure 9A:
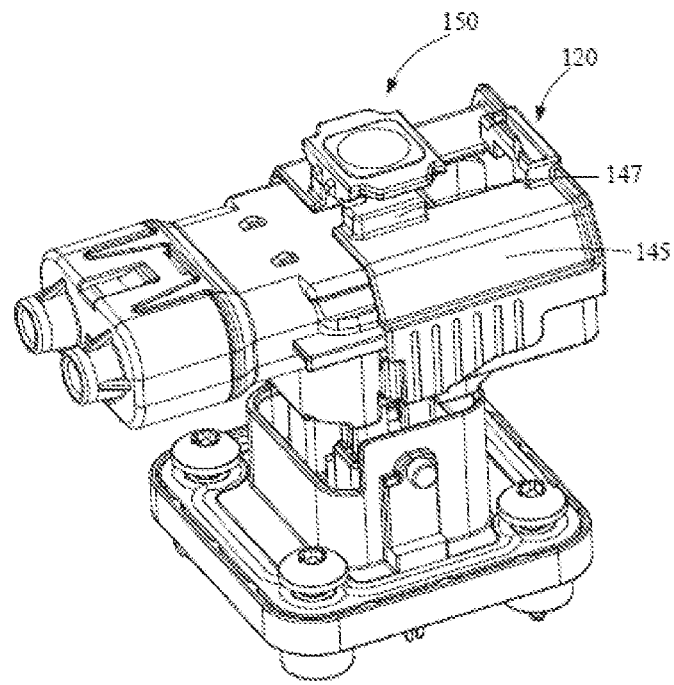
FIGS. 9A-9D show operation steps of the connector assembly shown in FIG. 4 wherein schematic diagrams respectively shown the connector assembly in four states of un-assembly, pre-assembly, insertion in place and assembly in place.

As shown in FIG. 9A, when the connector assembly 120 is in the unassembled state, the first connector 130 and the second connector 140 are in a separated state. Optionally, the position assurance apparatus 150 can be directly installed on the first connector 130 to reduce the number of parts to be assembled and improve the installation efficiency. When the connector assembly 120 is in the unassembled state, the stepped portion 147 on the sliding cover 145 abuts against the abutting portion 154 of the position assurance apparatus 150 to prevent the position assurance apparatus 150 from being pressed down into the opening 146 of the second connector 140 to turn on the signal circuit.

Figure 9B:
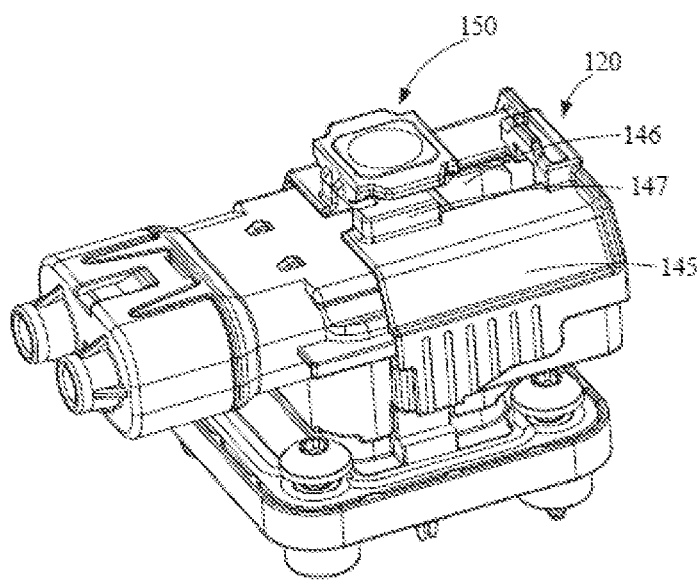

As shown in FIG. 9B, when the connector assembly 120 is in the pre-assembled state, a portion of the second connector 140 is inserted in the first connector 130, and at this time, the connector assembly 120 is not inserted in place. Continue to refer to FIG. 4 and FIG. 9B, in this state, the limiting pin 136 fixed on the first connector 130 has just been inserted in the sliding groove 148 inside the sliding cover 145. At this time, the stepped portion 147 on the top of the sliding cover 145 still abuts against the abutting portion 154 of the position assurance apparatus 150 to prevent the position assurance apparatus 150 from being pressed into the opening 146.

Figure 9C:
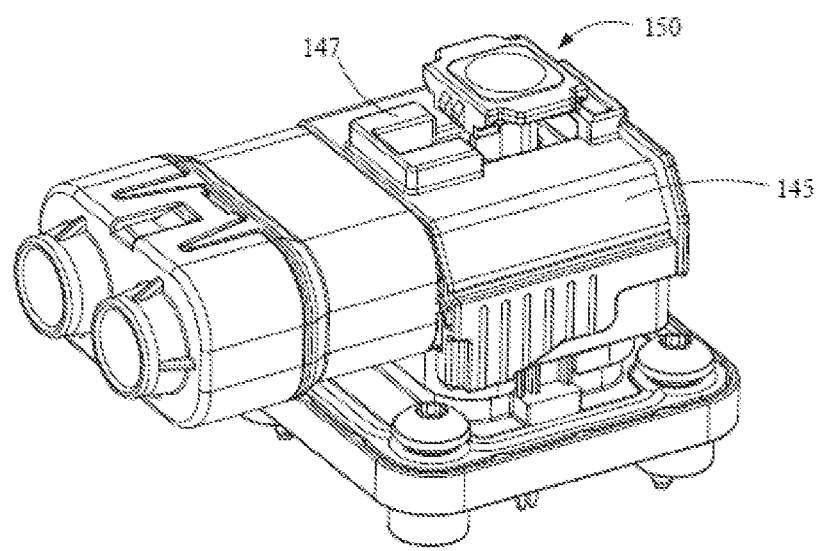

As shown in FIG. 9C, at this time, the second connector 140 is completely inserted in the first connector 130, and the connector assembly 120 is in the state of insertion in place. Continuing to refer to FIG. 4 and FIG. 9C, the limiting pin 136 fixed on the first connector 130 is inserted in the sliding groove 148 inside the sliding cover 145. Since the sliding groove 148 is configured in the shape of a broken line, when the sliding cover 145 is moved by an external force, the second connector 140 moves along the sliding groove 148, so the second connector 140 moves downward and is completely inserted in the first connector 130 and horizontally moves to the left, to realize that the second connector 140 is inserted in the first connector 130 in place. At the same time, the stepped portion 147 of the second connector 140 no longer abuts against the abutting portion 154 of the position assurance apparatus 150. At this time, the limiting function of the limiting member is released, allowing the position assurance apparatus 150 to be pressed into the opening 146.

Figure 9D:
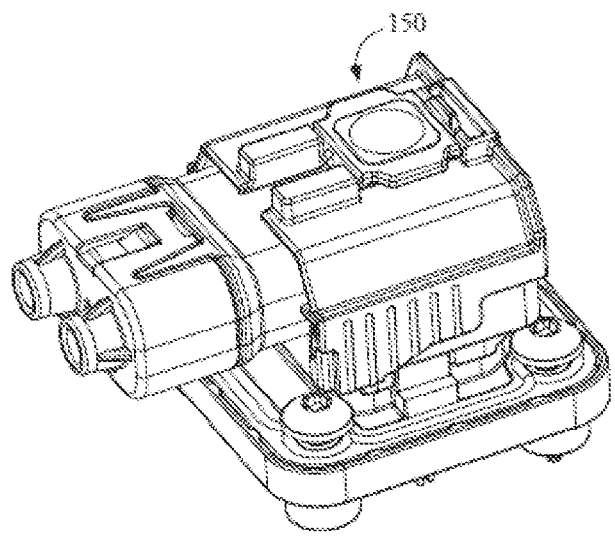

As shown in FIG. 9D, the connector assembly 120 is now in the assembled state. The position assurance apparatus 150 is pressed into the opening 146 and fastened so the signal circuit from the circuit board 103 is turned on, prompting that the second connector 140 is inserted in the first connector 130 in place. Optionally, in order to fasten the position assurance apparatus 150, a locking structure may be provided on the position assurance apparatus 150 and/or the sliding cover 145. For example, the position assurance apparatus 150 and the sliding cover 145 are respectively provided with a snap protrusion and a snap recess, so after the position assurance apparatus 150 is pressed down, the snap protrusion is pressed into the snapping recess of the sliding cover 145 to achieve fastening.

Figure 10:
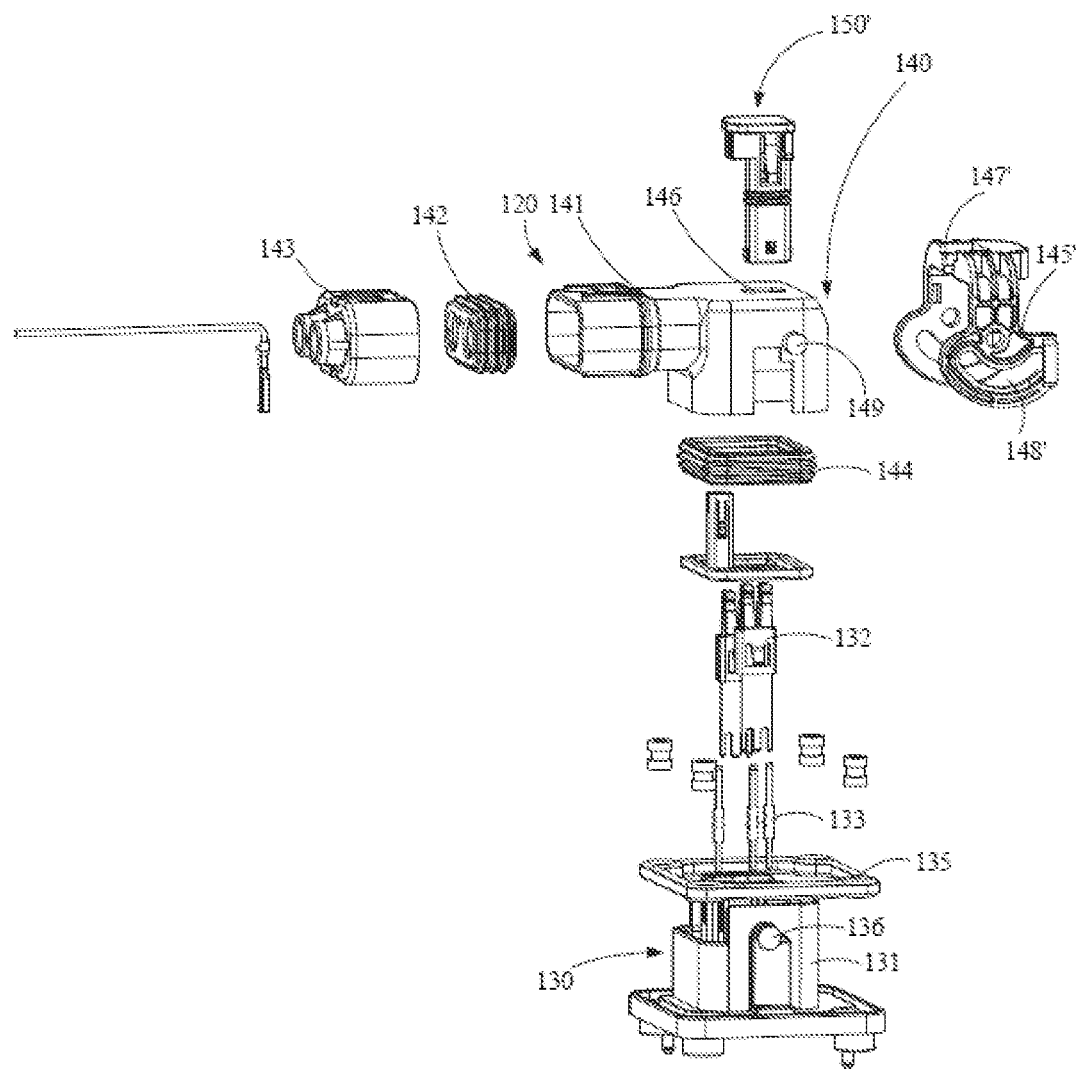
FIG. 10 is an exploded schematic view of a connector assembly according to another embodiment of the present disclosure.

FIG. 10 is an exploded schematic view of the connector assembly 120 of another embodiment of the present disclosure. The position assurance apparatus 150' is also configured to be pressed into the opening 146 and turn on the signal circuit when the second connector 140 is inserted in the first connector 130 in place.

The structure of the first connector 130 in this embodiment is substantially the same as the structure of the first connector 130 in the above-mentioned embodiment, but it should be noted that the protruding portion 131*b* of the first connector 130 is provided with a limiting pin 136 protruding outwardly. In this embodiment, the limiting pin 136 can cooperate with a rotation limiting groove 148' formed on a rotating handle 145' to limit the rotation of the rotating handle 145'. As for the second connector 140, the configuration is substantially the same except that a rotary member is used to replace the sliding member as the first limiting member and a hinge pin 149 is provided to hinge the rotary handle 145' to the second connector 140.

In this embodiment, the first limiting element is a rotating member with a protrusion 147', that is, the rotating handle 145'. The rotating handle 145' is provided such as in a hinged manner at the second end of the plug body 141 and is rotatable, such as about a hinge pin 149, between the first position and the second position.

As shown in FIG. 10, the rotating handle 145' has a generally U-shape as a whole, and each end thereof is formed with a rotation restricted groove 148 having an arc shape as a whole and curved with a predetermined arc around the hinge hole hinged with the hinge pin 149'. After the rotation restricted pin 136 of the first connector 130 is snapped into the rotation restricting groove 148', the rotating handle 145' can rotate around the hinge pin 149 within an angular range predetermined by the rotation restricting groove 148'.

Figure 11:
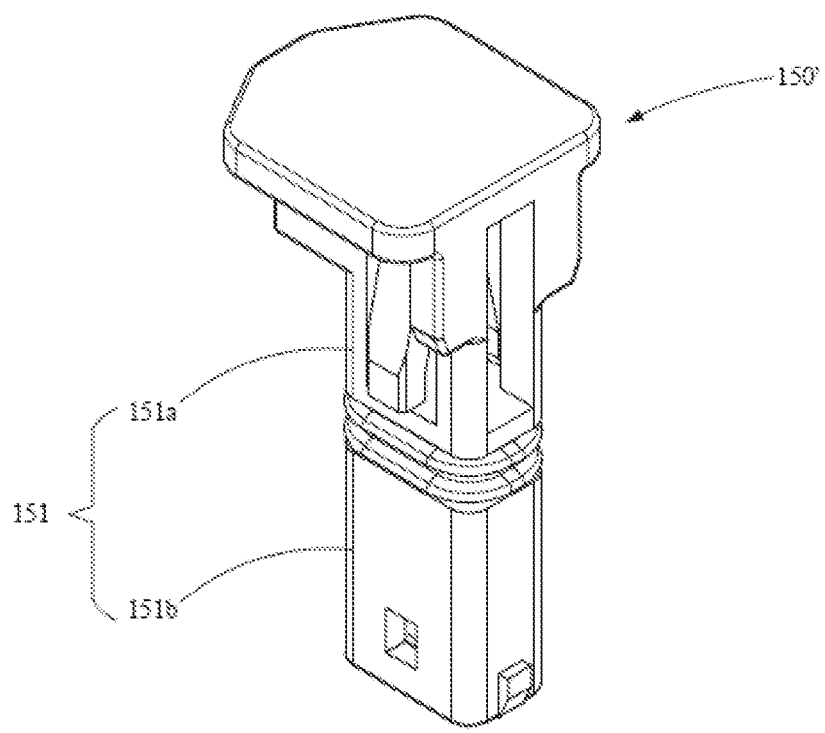
FIG. 11 is a perspective view of a position assurance apparatus in another embodiment used in a connector assembly.
Figure 12:
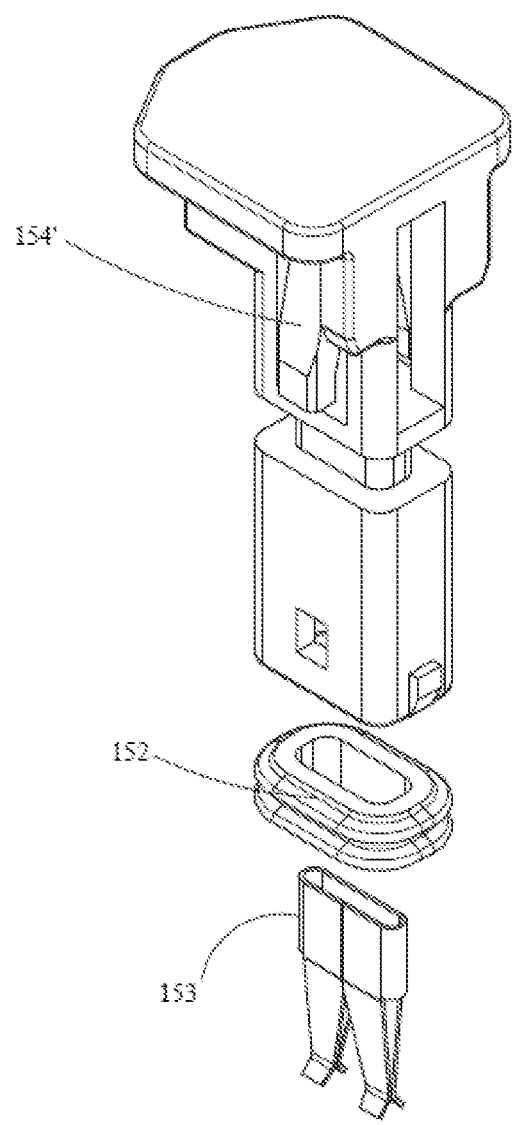
FIG. 12 is an exploded view of the position assurance apparatus shown in FIG. 11.

FIGS. 11 and 12 are a perspective view and an exploded view, respectively, of a position assurance apparatus 150' used in another embodiment of the connector assembly 120.

Similar to the above embodiment, the position assurance apparatus 150' in this embodiment includes the body portion 151, the sealing ring 152 and the conductive sheet 153. The body portion 151 is formed by injection molding, and the ring groove for accommodating the sealing ring 152 is provided in the middle portion of the body portion 151. The ring groove divides the body portion 151 into the upper body portion 151*a* and the lower body portion 151*b*. The lower body portion is roughly in the shape of a hollow sleeve, or in other words, a slot for pressing the conductive sheet 153 is formed in the lower body portion. The difference between this embodiment and the above-mentioned embodiment is that the elastic pieces 154' are formed on the upper body portion 151*a*, and the elastic pieces 154' are disposed on both sides of the position assurance apparatus 150' to serve as the second limiting element.

When the rotating handle 145' is at the first position, the elastic piece 154' protrudes from the opening 146 of the second connector 140, thereby preventing the position assurance apparatus 150' from being pressed into the opening 146. When the rotating handle 145' is at the second position, the protrusion 147' of the rotating handle 145' contacts and presses the elastic piece 154' of the position assurance apparatus 150' to press the elastic piece 154' into the opening 146, thereby pressing the position guarantee device 150' into opening 146 and turning on the signal circuit from the circuit board 103.

Four operation steps of assembling the connector assembly of another embodiment will be briefly described in conjunction with FIGS. 13A-13D as follows. FIGS. 13A-13D respectively show schematic views of the connector assembly 120 in the four states of the un-assembly, pre-assembly, insertion in place and assembly in place. The rotating handle 145' is configured to be at the first position when the connector assembly 120 is in the states of the un-assembly and pre-assembly. That is, the elastic piece 154' protrudes from the opening 146 to prevent the position assurance apparatus 150' from being pressed into the opening 146 to turn on the signal circuit. When the connector assembly 120 is in the states of insertion in place and assembly in place, the rotating handle 145' is configured to be at the second position. That is, the elastic piece 154' no longer protrudes from the opening 146 to allow the position assurance apparatus 150' to be pressed into the opening 146 to turn on the signal circuit.

Figure 13A:
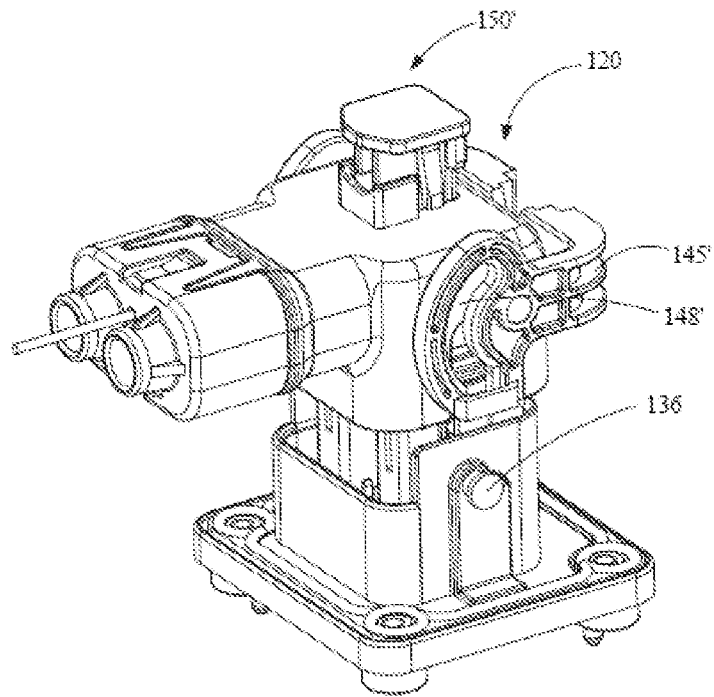
FIGS. 13A-13D show operation steps of the connector assembly shown in FIG. 10, wherein schematic diagrams respectively shown the connector assembly in four states of un-assembly, pre-assembly, insertion in place and assembly in place.

As shown in FIG. 13A, when the connector assembly 120 is in the unassembled state, the first connector 130 and the second connector 140 are in a separated state, and the limiting pin 136 of the first connector 130 has not been snapped into the rotation restricting groove 148' at this time, so the rotating handle 145' and the position assurance apparatus 150' are both in a state of immobility.

Figure 13B:
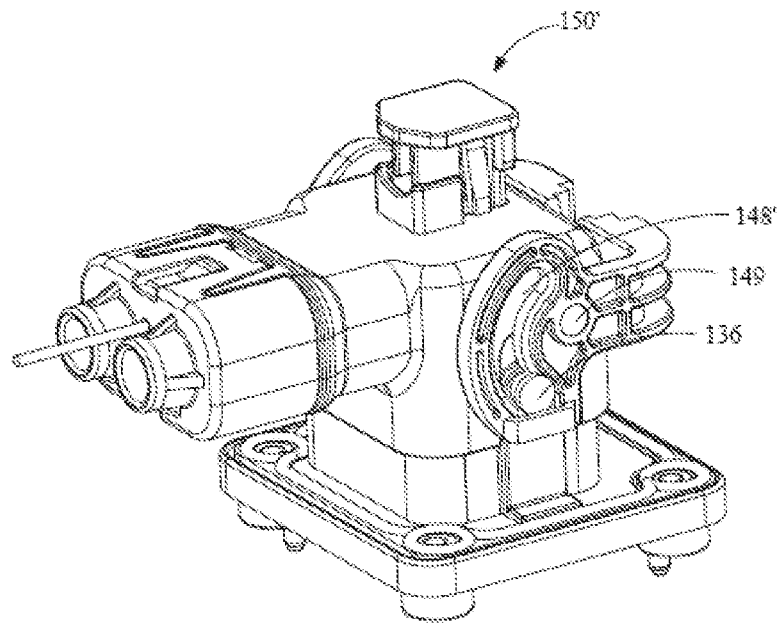

As shown in FIG. 13B, when the connector assembly 120 is in the pre-assembled state, a part of the second connector 140 is inserted in the first connector 130, and the limiting pin 136 of the first connector 130 are snapped into the rotation restricting groove 148'. The rotating handle 145' can be rotated about the hinge pin 149 from a 180° position in the horizontal direction. At this time, the limiting pin 136 of the first connector 130 is located at a first limiting end of the rotation restricting groove 148'. However, since the elastic piece 154' of the position assurance apparatus 150' protrudes from the opening 146 of the second connector 140, the position assurance apparatus 150' is prevented from being pressed into the opening 146.

Figure 13C:
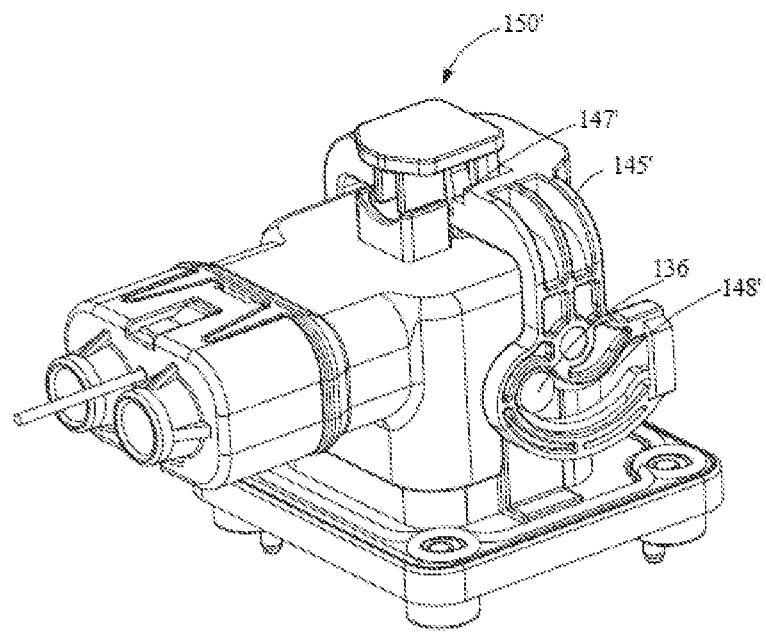

As shown in FIG. 13C, at this time, the second connector 140 is completely inserted in the first connector 130, and the connector assembly 120 is in the state of insertion in place. During the process from pre-assembly to insertion in place, the rotating handle 145' is rotated from the 1800 position in the horizontal direction to a 900 position in a vertical direction, and the rotation restricting groove 148' moves relative to the limiting pin 136 in the following manner, that is, it moves from the first limiting end of the rotation restricting groove 148' where the limiting pin 136 is located to an opposite second limiting end of the rotation restricting groove 148' where the limiting pin 136 is located. At this time, the second connector 140 is inserted in the first connector 130 in place, and the protrusion 147' of the rotating handle 145' contacts and presses the elastic piece 154' of the position assurance apparatus 150' to press the elastic piece 154' into the opening 146. At this time, the limiting function of the limiting member is released, thus allowing the position assurance apparatus 150' to be pressed into the opening 146.

Figure 13D:
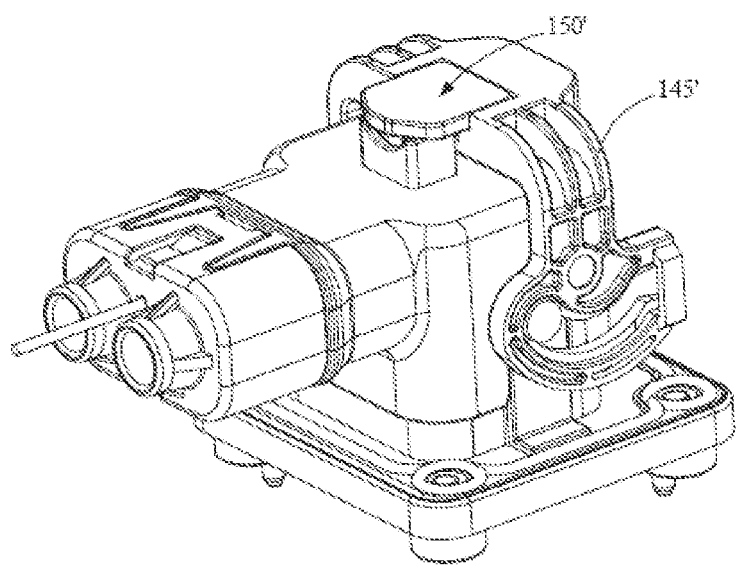

As shown in FIG. 13D, since the limiting pin 136 of the first connector 130 reaches the opposite second limiting end, the rotating handle 145' is no longer rotated. The position assurance apparatus 150' is pressed into the opening 146 and fastened so the signal circuit from the circuit board 103 is turned on, prompting that the second connector 140 is inserted in the first connector 130 in place.

In the several embodiments of the connector assembly 120 as described above, a connector assembly system can be obtained. The connector assembly system includes a first assembly device and a second assembly device. The first assembly device is used to insert the second connector 140 in the first connector 130 of the connector assembly 120 in place. The second assembly system is used to press the position assurance apparatus 150 into the opening 146 of the second connector 140 to turn on the signal circuit via the first connector 130.

An embodiment of the present disclosure also provides a method for assembling the connector assembly 120, including:

inserting the second connector 140 in the first connector 130 of the connector assembly 120 in place;

pressing the position assurance apparatus 150 into the opening 146 of the second connector 140 and turning on the signal circuit via the first connector 130.

In some embodiments, the method for assembling the connector assembly 120 further includes: when the second connector 140 is not inserted in the first connector 130 in place, operating the limiting member to prevent the position assurance apparatus 150 from being pressed into the opening of the second connector 140 and turn on the signal circuit via the first connector 130.

Referring to FIGS. 14A-14F, a method for assembling the connector assembly 120 is described in conjunction with these figures. It should be noted that although the above drawings illustrate an embodiment of the connector assembly 120, the operation methods of other alternative embodiments of the connector assembly 120 are also easily understood by those skilled in the art.

Specifically, the method mainly comprises the following three steps.

Figure 14A:
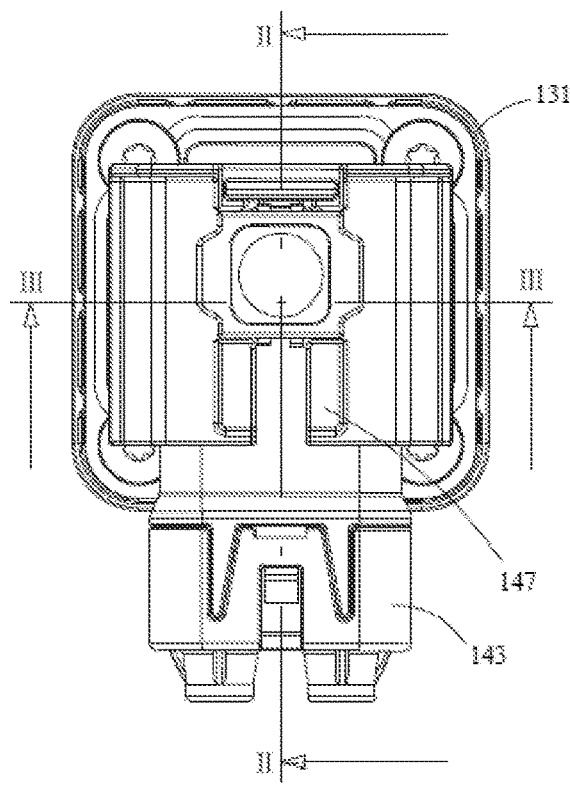
Figure 14B:
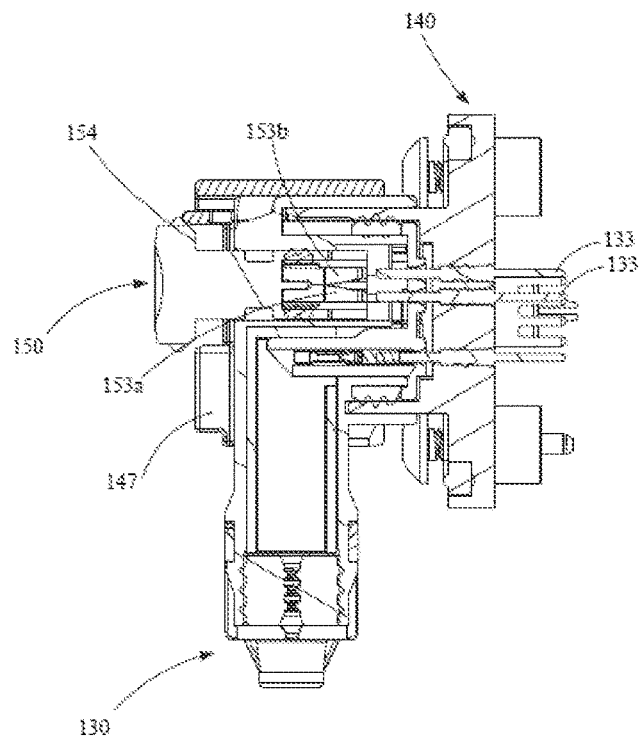
Figure 14C:
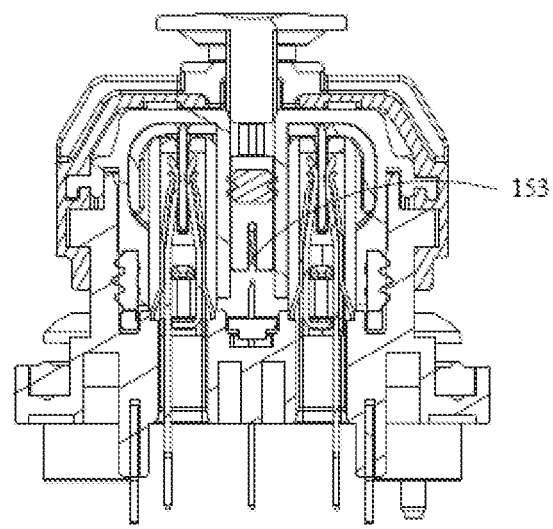

(i) Referring to FIGS. 14A-14C, when the second connector 140 is not inserted in the first connector 130 of the connector assembly 120 in place, the limiting member, such as the stepped portion 147 of the sliding cover 145, is operated, so the stepped portion 147 abuts against the abutting portion 154 of the position assurance apparatus 150 to prevent the position assurance apparatus 150 from being pressed into the opening 146 of the second connector 140 and turning on the signal circuit of the circuit board 103 via the LIN wire solder pins 133 of the first connector 130.

Figure 14D:
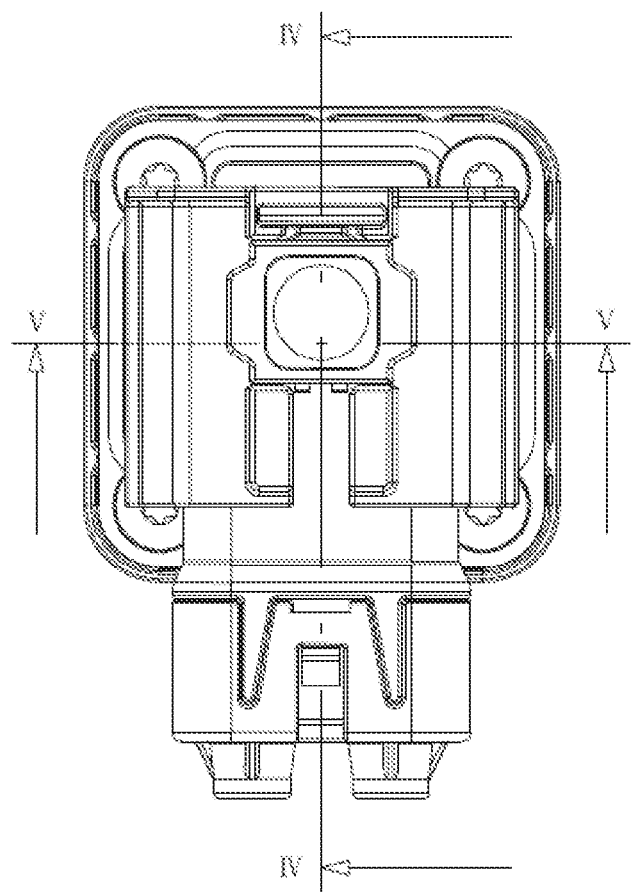
Figure 14E:
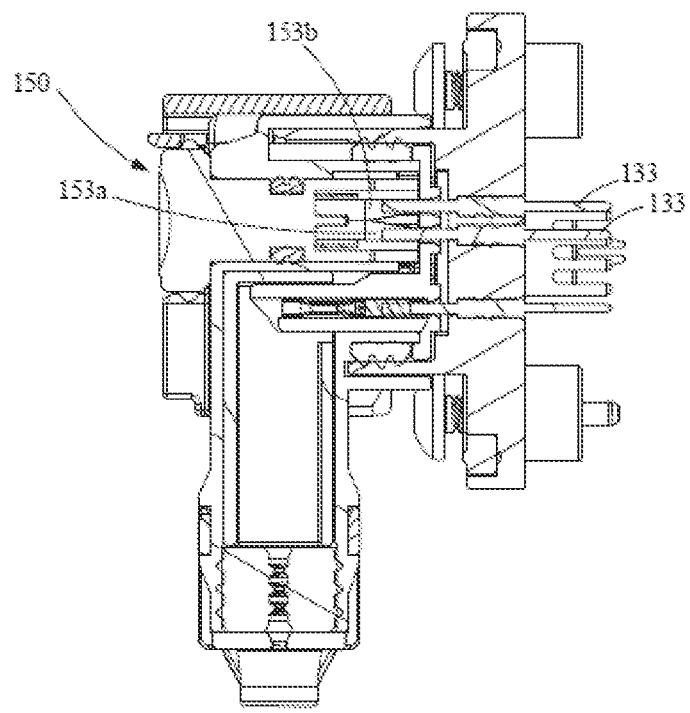
Figure 14F:
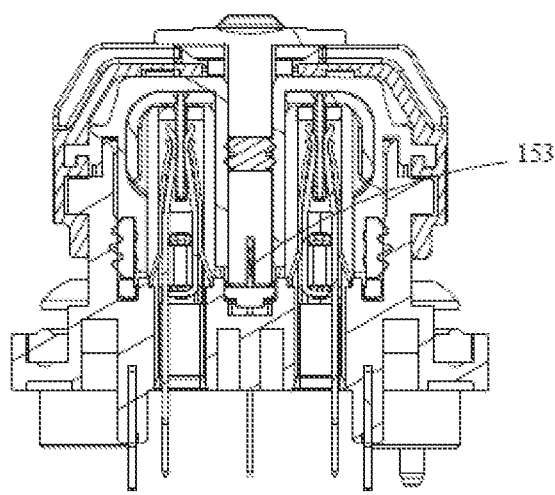

(ii) Please refer to FIGS. 14D-14F, the sliding cover 145 is moved so the stepped portion 147 of the sliding cover 145 no longer abuts against the abutting portion 154 of the position assurance apparatus 150, and at the same time the second connector 140 is inserted in the first connector 130 of the connector assembly 120 in place.

(iii) Continue to refer to FIGS. 14D-14F, the position assurance apparatus 150 is pressed into the opening 146 of the second connector 140 and the signal circuit of the circuit board 103 is turned on via the first connector 130. Specifically, when the position assurance apparatus 150 is pressed into the opening 146 of the second connector 140, the first connecting portion 153$a$ and the second connecting portion 153$b$ of the position assurance apparatus 150 are respectively electrically connected to the LIN wire solder pins 133, thus the signal circuit of circuit board 103 is turned on.

By providing the limiting member, when the second connector 140 is not inserted in the first connector 130 of the connector assembly 120 in place, the position assurance apparatus 150 can be prevented from being pressed into the opening 146 of the second connector 140 and turning on the signal circuit when the connector assembly 120 is not inserted in place, which can ensure the accuracy of detection. For those skilled in the art, it may be necessary to increase or decrease the steps in the above method, and such modifications should also fall within the protection scope of the present disclosure.

Although the structure of the position assurance apparatus, the connector assembly, the battery, the power consumption device, the connector assembly system and the method for assembling the connector assembly of the present disclosure have been described above with reference to several embodiments, those skilled in the art should realize that the above examples are for illustration only, and not as a limitation to the present disclosure. For example, in addition to the sliding limiting member and the rotation limiting member described in the specification, other types of limiting members and the like can also be designed based on common knowledge in the art. Therefore, modifications and variations of the present disclosure may be made within the essential spirit of the claims, and these modifications and variations will fall within the scope of the claims of the present disclosure. In particular, as long as there is no structural conflict, each technical feature mentioned in each embodiment can be combined in any manner. The present disclosure is not limited to the specific embodiments disclosed herein, but includes all technical solutions falling within the scope of the claims.

What is claimed is:

1. A battery comprising:
    a battery cell;
    a connector assembly comprising:
        a first connector to be connected with a signal circuit;
        a second connector comprising an opening and configured to be inserted in the first connector; and
        a position assurance apparatus for a connector assembly connected with a signal circuit, wherein the connector assembly comprises a first connector and a second connector connected in pairs, the first connector is connected with the signal circuit, and the second connector is inserted in the first connector, the position assurance apparatus comprising:
            a first connecting portion;
            a second connecting portion electrically connected with the first connecting portion,
            wherein the first connecting portion and the second connecting portion are configured to be electrically connected with the signal circuit via the first connector to turn on the signal circuit when the second connector is inserted in the first connector in place, wherein the position assurance apparatus is to be pressed into the opening and turn on the signal circuit when the second connector is inserted in the first connector in place;
    a circuit board comprising a signal circuit, wherein the signal circuit is configured to be turned on via the position assurance apparatus when the second connector is inserted in the first connector in place; and
    a battery management system used to detect a voltage of the signal circuit and issue an alarm signal when the voltage is zero to prompt that the connector assembly is not inserted in place.

2. The battery according to claim 1, wherein the first connecting portion comprises two elastic tabs disposed oppositely to each other, and each of the elastic tabs comprises an elastic contacting portion configured to be electrically connected with the first connector.

3. The battery according to claim 2, wherein at least one of the two elastic tabs comprises an indentation for reducing a distance between the elastic contacting portions of the two elastic tabs, to ensure that at least a part of the first connector inserted between the elastic contacting portions of the two elastic tabs is in close contact with the elastic contacting portion.

4. The battery according to claim 1, further comprising a conductive base in a shape of a hollow sleeve, wherein the conductive base comprises a first end and a second end disposed opposite to each other, and the first connecting portion and the second connecting portion are configured to be connected with the first end.

5. The battery according to claim 4, further comprising a body portion provided with a slot, wherein the second end of the conductive base is configured to be matched with the slot so that the conductive base is mounted on the body portion.

6. The battery according to claim 5, wherein an engaging portion is formed in the slot of the body portion, an engaging notch is formed on the second end, and the engaging notch is engaged with the engaging portion to fix the conductive base to the body portion.

7. The battery according to claim 1, further comprising a limiting member for preventing the position assurance apparatus from being pressed into the opening and turning on the signal circuit via the first connector when the second connector is not inserted in the first connector in place.

8. The battery according to claim 7, wherein the limiting member comprises:
    a first limiting element disposed on the second connector;
    a second limiting element disposed on the position assurance apparatus,
    wherein the first limiting element is configured to be engaged with the second limiting element to prevent the position assurance apparatus from being pressed into the opening to turn on the signal circuit when it is in the first position, and allow the position assurance apparatus to be pressed into the opening and turn on the signal circuit when it is in the second position.

9. The battery according to claim 8, wherein the second limiting element comprises elastic pieces disposed on both sides of the position assurance apparatus, and the elastic pieces are configured to protrude from the opening when the first limiting member rotates to the first position to prevent the position assurance apparatus from being pressed into the opening.

10. The battery according to claim 8, wherein the first limiting element is configured as a rotating member comprising a protrusion, and the protrusion is configured to press the elastic pieces into the opening when the first limiting element rotates to the second position, thereby pressing the position assurance apparatus into the opening.

11. The battery according to claim 8, wherein the first limiting element is configured as a sliding member comprising a stepped portion, and the stepped portion is configured to allow the position assurance apparatus to be pressed into the opening and turn on the signal circuit when the first limiting element moves to the second position.

12. The battery according to claim 11, wherein the second limiting element comprises an abutting portion, and the abutting portion is configured to abut against the stepped portion when the first limiting element moves to the first position, to prevent the position assurance apparatus from being pressed into the opening.

* * * * *